United States Patent [19]

Kelley

[11] Patent Number: 5,665,923
[45] Date of Patent: Sep. 9, 1997

[54] FULL RANGE-HIGH ACCURACY AIR FLOW SENSING DEVICE

[75] Inventor: Winfield LeRoy Kelley, Miami, Fla.

[73] Assignee: Warren Technology, Inc., Hialeah, Fla.

[21] Appl. No.: 578,779

[22] Filed: Dec. 26, 1995

[51] Int. Cl.$^6$ .................................................. G01F 1/46
[52] U.S. Cl. ............................ 73/861.66; 73/861.53; 73/861.62
[58] Field of Search .................. 73/861.52, 861.53, 73/861.61, 861.62, 861.63, 861.64, 861.66, 861.67; 454/254, 255, 267

[56] References Cited

U.S. PATENT DOCUMENTS

| 2,714,819 | 8/1955 | Clark | 73/861.66 |
| 3,792,620 | 2/1974 | Lukitsh | 74/200 |
| 3,895,531 | 7/1975 | Lambert | 73/861.66 |
| 4,387,685 | 6/1983 | Abbey | 73/861.53 X |
| 4,481,829 | 11/1984 | Shortridge | 73/861.66 |
| 4,548,076 | 10/1985 | Haake et al. | 73/202 |
| 4,570,493 | 2/1986 | Leemhuis | 73/861.62 |
| 4,602,514 | 7/1986 | Kurrie et al. | 73/861.66 |
| 4,754,651 | 7/1988 | Shortridge et al. | 73/861.42 |
| 4,777,932 | 10/1988 | Pennington | 126/290 |
| 4,993,269 | 2/1991 | Guillaume et al. | 73/861.53 |

FOREIGN PATENT DOCUMENTS

| 2558935 | 7/1977 | Germany | 73/861.53 |
| 2828880 | 1/1980 | Germany | 73/861.53 |

Primary Examiner—Richard Chilcot
Assistant Examiner—Paul D. Amrozowicz
Attorney, Agent, or Firm—Watson Cole Stevens Davis, P.L.L.C.

[57] ABSTRACT

An air flow sensing device comprised of rotatable spaced dampers, shafts to rotate the dampers, a counter-weight attached to a shaft biasing the dampers to a closed position with respect to air flow and pressure sensor means to determine the velocity of the air passing between and around the dampers when the dampers are in a closed position.

21 Claims, 2 Drawing Sheets

FULL RANGE-HIGH ACCURACY AIR FLOW SENSING DEVICE

The present invention relates to a high accuracy flow sensing device for air flows below 300 fpm.

BACKGROUND OF THE INVENTION

A conventional method for measuring air flow in the air conditioning industry is by sensing the air velocity in a duct or plenum with a velocity pressure sensing device. This method, however, is not accurate or reliable at low air flow levels due to the present state of the art of instrumentation and the nature of velocity pressure vs. air flow relationship. When reliable, accurate measurement of air flow less than 300 fpm is required, either high cost instrumentation and/or devices that impose unnecessary pressure loss and excessive noise, must be employed to attain accurate sensing of such velocities. The applicability and accuracy of these devices is also limited by the wide range of flow conditions that they must typically handle for Variable-Air-Volume systems. Variable cross sectional area devices are known which require a manual adjustment of the open area or the insertion of an aperture plate to achieve a given velocity/flow relationship.

It is, therefore, an object of the present invention to provide an air flow measuring device which will measure more accurately greater ranges of air flow in air ducts and plenums.

Another object of the present invention is to provide a cheaper and more simple device for measurement than known expensive instrumentation.

A still further object of the present invention is to provide a device which is less noisy and minimizes pressure loss at a maximum air flow without the sacrifice of reduced cross sectional area at low air flows or the need to readjust or remove a cross-sectional area reduction element.

Another object of the present invention is to provide an air flow measuring device which does not require a manual adjustment of the open area to achieve a given velocity/flow relationship.

A still further object of the present invention is to provide an air flow measuring device where the cross-sectional area of the air flow is automatically varied by the velocity pressure exerted against the rotatable damper blades.

Another object of the present invention is to provide a device which will permit continuous readings to be made throughout the entire range of air velocity flow without the need to manually adjust the opening or insert an aperture plate.

SUMMARY OF THE INVENTION

The present invention is a device composed of a housing, rotatable spaced pressure dampers mounted in the housing on shafts, means to rotate the dampers in opposite directions, a counterweight fixable to one shaft to create variable moments and a pressure sensor means to determine the velocity of the air entering the housing and coming in contact therewith.

The cross sectional area of the air flow is automatically varied by the velocity pressure exerted against the rotatable damper blades. Thus, continuous readings may be made throughout the entire range of air flow without manual adjustment or insertion of an aperture plate. At maximum air flow the pressure loss is automatically minimized without sacrifice of reduced cross-sectional air at low air flow.

The device provides accurate flow measurement in air ducts and plenums over a greater range (especially at low flow rates) than the present state of the art without the use of expensive instrumentation or the imposition of significant pressure loss or noise. The increased accuracy is proportional to the size of the velocity pressure dampers and the gravitational-movement bias created by the adjustable counterweight.

BRIEF DESCRIPTION OF THE DRAWINGS

Other details and features of the invention will stand out from the description given below by way of non-limitative example and with reference to the accompanying drawings, in which.

DESCRIPTION OF THE PREFERRED EMBODIMENT

Figure 1:
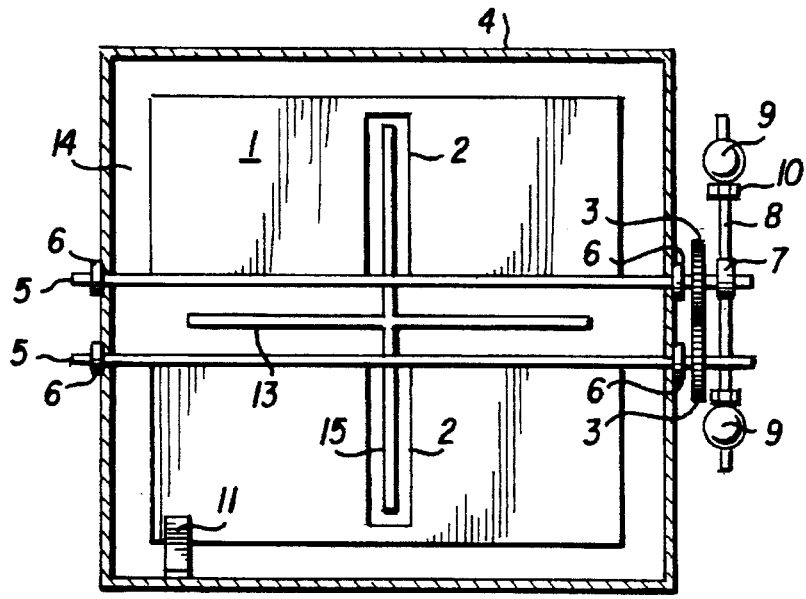
FIG. 1 is an elevational vertical cross-sectional view of the device of the present invention.
Figure 2:
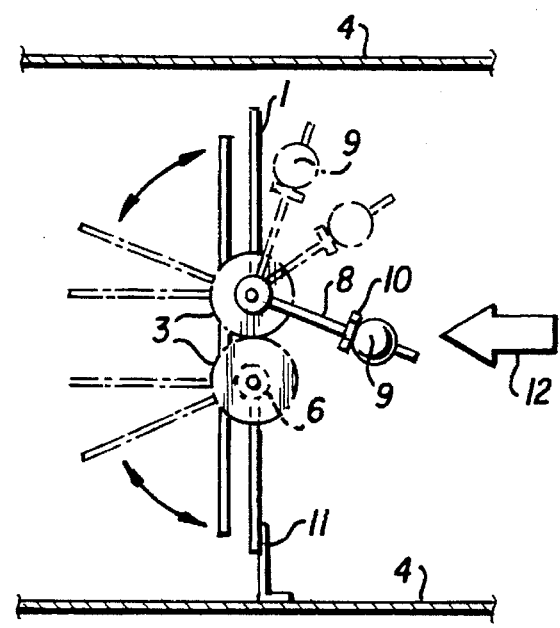
FIG. 2 is a left-side elevational view of the device of FIG. 1.
Figure 3:
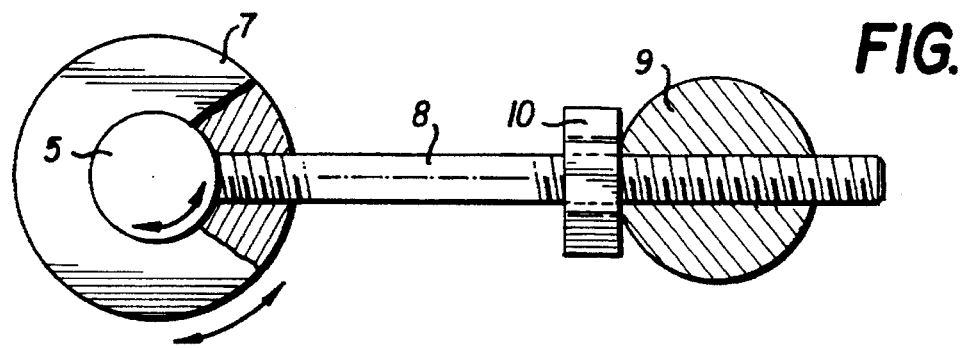
FIG. 3 is an enlarged view of the gravitational biasing mechanism of the present invention.

FIGS. 1 and 2 show the device of the present invention including rotatable dampers 1 which are light-weight sheet metal or plastic fixed to shafts 5. The dampers may be of different shapes, e.g., square, rectangular, round, oblong and oval and have a slot 2 therein. The damper shafts 5 are fixed to meshing spur gears 3 so that both shafts 5 simultaneously rotate the same amount in opposite directions. The dampers 1 and shafts 5 are mounted within a housing 4 by bearings 6. A shaft collar 7 fits over one of the shafts 5 and is slidable thereon. The collar 7 is radially internally threaded to receive a set screw threaded bar 8 which allows the bar 8 to be positioned anywhere on the circumference of the shaft 5 to create a relative bias adjustment. Threaded onto bar 8 is an internally threaded adjustable rotatable barometric counterweight 9 to create a constant bias adjustment. Counterweight 9 is locked to bar 8 by locknut 10. An enlargement of the gravitational biasing mechanism may be seen in FIG. 3. A stop plate 11 is fixed to housing 4 to prevent dampers 1 from rotating from a closed position counter to the air flow 12 due to the positioning of the bar 8 on shaft 5. The two dampers 1 are spaced from each other at 13 and slotted at 2 for the purpose of letting the air flow pass through the dampers and be measured. A space 14 also is present between the dampers and the housing to allow for the air flow to pass by the dampers when the dampers are closed. A multipoint pivot tube 15 is placed in the center of housing 4 and registers the velocity of the air through the reduced openings when the dampers are fully closed as well as the velocity through the housing 4 when the dampers are partially or fully opened.

The device utilizes a variable opening which directs the air flow through a reduced area in a duct when there are air velocities less than the effective accuracy range of conventional velocity sensors. The increased velocity through the reduced open-area permits accurate readings at low air flows. As the air flow increases, the dampers open and the flow area increases geometrically to minimize the pressure loss created by the device.

The gravitational bias mechanism combined with the variable blade area (projected perpendicular to air flow)

creates a decreasing moment of force to compensate for the decreasing velocity pressure vector force as the dampers open. This minimizes the pressure loss caused by the device at higher air flows.

The accuracy of the device may be increased by decreasing the size of the open-air passage when the device is in the closed position and may be varied with an adjustment of the bias mechanism, to adapt to the limits of acceptable pressure loss and effective sensor range.

The use of paired, opposed-blade dampers with opposite rotation directions serves to neutralize the inherent gravitational moment that a single blade could create.

Figure 4:
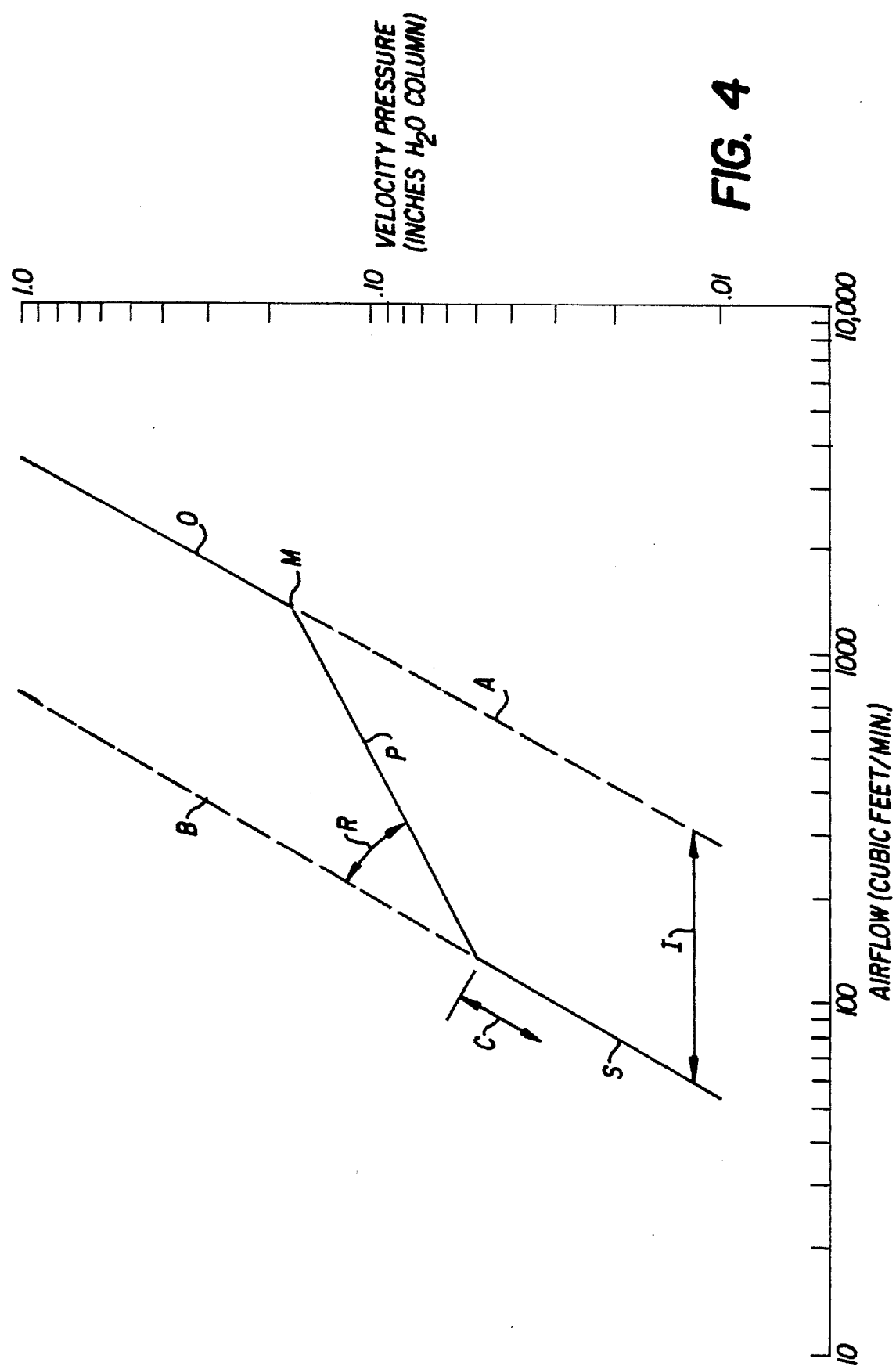
FIG. 4 is a chart of the air flow velocity of the device of the present invention.

FIG. 4 depicts the velocity of the air flow in cubic feet per minute when the dampers of the device of the invention are completely closed, "S" partially opened "P", and fully opened "O". In FIG. 4, "A" indicates the full area of the duct. "B" indicates the area open to air flow with fully closed dampers. "P" indicates the air flow of partially open dampers, i.e., between fully closed dampers and fully opened dampers. "C" indicates the constant bias adjustment. "I" indicates the range of improved accuracy. "M" indicates the, maximum air flow necessary to fully open the dampers. "R" indicates the relative bias adjustment.

When the air flow in the duct is low (typically<300 fpm), the weight-bias resists the velocity pressure and the flow is thereby directed through the opening through and around the closed damper blades. The velocity pressure is sensed by a multipoint pitot tube in the center of the openings. As the velocity through the reduced openings increases and becomes greater than the duct velocity (gross cross sectional area), the accuracy of the sensing is increased correspondingly. As the air flow increases, the velocity pressure vector gradually rotates the dampers against the gravitational-bias mechanism to increase the open area. As that happens, the effective surface area of the dampers, which is perpendicular to the air flow, decreases geometrically, and the pressure loss of the device gradually disappears as the dampers reach their open position.

The adjustable counterweight may be set to minimize the pressure loss of the device at the maximum desired air flow. Full-range velocity pressure vs. air flow relationship tables or curves can be produced for any desirable flow setting and duct size combination.

Various modifications of the specific embodiment described and shown may be made, and it is understood that the specific embodiment is by way of illustration of the invention and not limiting thereto.

I claim:

1. Air flow sensing device comprising rotatable spaced dampers, means to rotate said dampers, counter-weight means attached to said means to rotate to bias said dampers to a closed position with respect to air flow and pressure sensor means to determine the velocity of the air passing between said dampers in said closed position.

2. The air flow sensing device according to claim 1, wherein said means to rotate include a shaft fixed to each damper, meshing spur gears, one of said spur gears being fixed to each of said damper shafts to cause both shafts simultaneously to rotate in opposite directions.

3. The air flow sensing device according to claim 1, wherein said counter-weight means comprises a threaded rod, an internally threaded counterweight threaded onto said threaded rod, a lock nut threaded onto said threaded rod to fix the position of said counterweight on said threaded rod, a collar slidably fitting onto one of said shafts, said collar being radially internally threaded, said threaded rod being threaded into said collar to variably lock said rod against said shaft.

4. The air flow sensing device according to claim 1, including a damper stop to prevent the dampers from opening in a direction against the air flow.

5. The air flow sensing device according to claim 1, including a housing for said rotatable dampers and said velocity pressure sensor.

6. The air flow sensing device according to claim 1, wherein each damper is configured to have a slot therein to permit air to pass therethrough.

7. The air flow sensing device according to claim 6, wherein said pressure sensor means registers air flow passing through the slot in each damper.

8. The air flow sensing device according to claim 5, wherein said housing has air flow space between said dampers and said housing.

9. The air flow sensing device according to claim 2, wherein said counter-weight means comprises a threaded rod, an internally threaded counterweight threaded onto said threaded rod, a lock nut threaded onto said threaded rod to fix the position of said counterweight on said threaded rod, a collar slidably fitting onto one of said shafts, said collar being radially internally threaded, said threaded rod being threaded into said collar to variably lock said rod against said shaft.

10. The air flow sensing device according to claim 2, including a housing for said rotatable dampers and said velocity pressure sensor.

11. The air flow sensing device according to claim 3, including a housing for said rotatable dampers and said velocity pressure sensor.

12. The air flow sensing device according to claim 9, including a housing for said rotatable dampers and said velocity pressure sensor.

13. The air flow sensing device according to claim 2, wherein each damper is configured to have a slot therein to permit air to pass therethrough.

14. The air flow sensing device according to claim 3, wherein each damper is configured to have a slot therein to permit air to pass therethrough.

15. The air flow sensing device according to claim 9, whereto each damper is configured to have a slot therein to permit air to pass therethrough.

16. The air flow sensing device according to claim 2, wherein said pressure sensor means registers air flow passing through the slot in each damper.

17. The air flow sensing device according to claim 3, wherein said pressure sensor means registers air flow passing through the slot in each damper.

18. The air flow sensing device according to claim 9, wherein said pressure sensor means registers air flow passing through the slot in each damper.

19. The air flow sensing device according to claim 2, wherein said housing has air flow space between said dampers and said housing.

20. The air flow sensing device according to claim 3, wherein said housing has air flow space between said dampers and said housing.

21. The air flow sensing device according to claim 9, wherein said housing has air flow space between said dampers and said housing.

* * * * *